United States Patent [19]
Skinner

[11] 3,783,907
[45] Jan. 8, 1974

[54] PIPE SPACERS

[75] Inventor: Harvey G. Skinner, Latrobe, Pa.

[73] Assignee: Westmoreland Plastics Company, Latrobe, Pa.

[22] Filed: Mar. 16, 1972

[21] Appl. No.: 235,360

[52] U.S. Cl. ............................................. 138/106
[51] Int. Cl. ............................................. F16l 3/10
[58] Field of Search .................................. 138/106; 425/DIG. 214; 248/54 R, 68 R

[56] References Cited
UNITED STATES PATENTS

| | | | |
|---|---|---|---|
| 3,437,297 | 4/1969 | Jirka et al. | 138/106 X |
| 3,479,420 | 11/1969 | Wilson et al. | 425/DIG. 214 |
| 2,462,399 | 2/1949 | Hinchman | 138/106 |

Primary Examiner—Jerry W. Myracle
Attorney—Buell, Blenko & Ziesenheim

[57] ABSTRACT

A pipe spacer is provided of blow molded plastic having two opposite sides with corresponding semi-cylindrical recesses therein corresponding to one half of the circumference of a pipe to be spaced.

4 Claims, 4 Drawing Figures

PATENTED JAN 8 1974  3,783,907

PIPE SPACERS

This invention relates to pipe spacers and particularly to a hollow blow molded pipe spacer which may be filled with sand, concrete or other filler material in place.

In placing duct in multiple configurations as is the case in telephone and other communication systems, it is usually necessary or desirable to provide a spacing mechanism for holding the several pipes in fixed position relative to one another both vertically and horizontally. This is generally accomplished by building a wooden framework with vertical and horizontal spacer members which hold the separate ducts in place. This is, of course, a time consuming and an expensive practice. Moreover, the framework will rot and disintegrate over a period of time and lose its effectiveness.

I have developed a hollow blow molded pipe spacer which will not rot or disintegrate and which can be filled with concrete, sand or other permanent filler material after being placed. The spacer of my invention is light and easily handled and relatively inexpensive as well as being very versatile in its mode of application.

Preferably I provide a pipe spacer comprising an elongated hollow member having two opposite sidewalls each with identical side-by-side U-shaped indentations adapted to receive a cylindrical duct and open at each end. Preferably the hollow member is formed by blow molding to maintain substantially uniform wall thickness throughout the hollow member. The hollow member is preferably rectangular in cross section having two parallel side walls and two opposite sidewalls with side-by-side semi-cylindrical indentations adapted to snugly receive a cylindrical duct.

In the foregoing general description I have set out certain objects, purposes and advantages of my invention. Other objects, purposes and advantages will be apparent from a consideration of the following description and the accompanying drawings in which.

Figure 1:
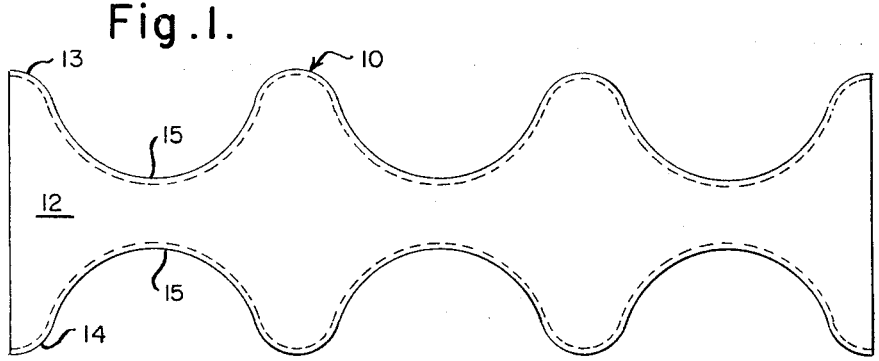
FIG. 1 is a side elevation of a pipe spacer according to this invention.
Figure 2:
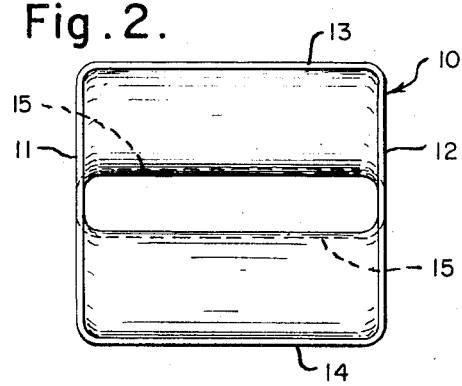
FIG. 2 is an end elevation of the pipe spacer of FIG. 1.

Referring to the drawings I have illustrated a pipe spacer according to this invention formed of blow molded plastic resin. The spacer 10 is made up of two spaced parallel walls 11 and 12 and two walls 13 and 14 transverse thereto, said transverse walls having identical side-by-side semi-cylindrical recesses 15 adapted to receive pipe 16. The pipe 16 may be secured to the spacer by an adhesive or it may be freely movable, as desired.

Figure 3:
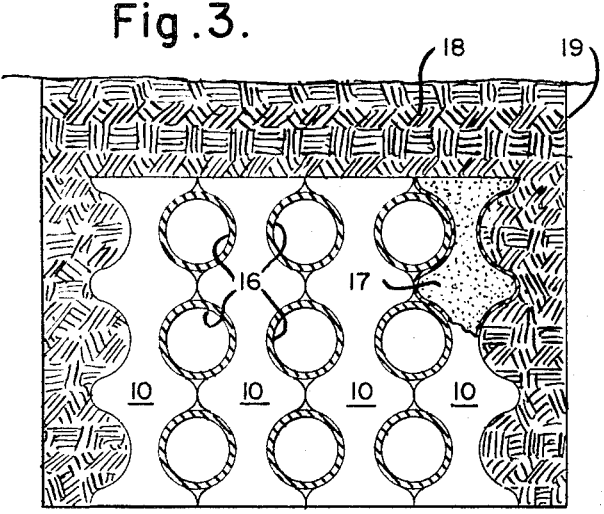
FIG. 3 is a vertical section through a multiple duct system using the spacer of this invention.
Figure 4:
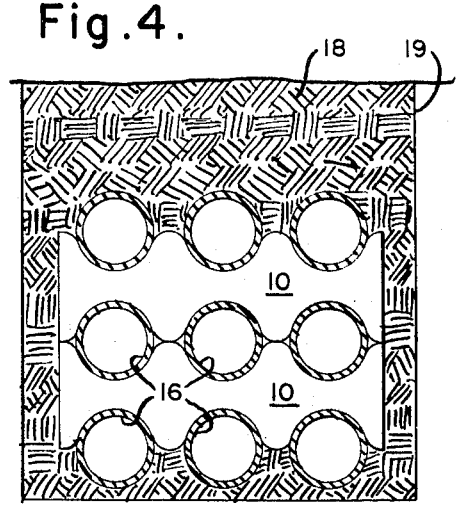
FIG. 4 is a vertical section through a second form of multiple duct system using the spacer of this invention.

The spacer of this invention may be used in the vertical position or in the horizontal position, as desired. In FIG. 3 I have illustrated a plurality of pipes 16 held between vertical spacers 10 filled with sand 17. The fill may be concrete, earth or some other filler material with the whole assembly surrounded by earth 18 backfilled into trench 19. In FIG. 4 I have illustrated pipes 16 spaced with spacers 10 in the horizontal position. The spacers are unfilled and the trench 19 is simply backfilled with earth 18 with no attempt to fill the spacers.

The spacer of this invention is particularly useful in placing underground communication ductwork in plastic resin ducts. In such cases the ducts may be bonded to the spacer with a resin adhesive and a group of ducts laid as a unit.

While I have illustrated and described a presently preferred embodiment and practice of my invention in the foregoing specification, it will be understood that this invention may be otherwise embodied within the scope of the following claims.

I claim:

1. A pipe spacer comprising an elongated hollow molded plastic member having a pair of spaced opposite sides with corresponding semi-cylindrical recesses therein adapted to receive half the circumference of a pipe to be spaced, said spacer being open at the ends parallel to the recesses forming a passage transverse to the pipe axes.

2. A pipe spacer as claimed in claim 1 wherein hollow member has a generally rectangular cross section formed of two parallel side walls and two transverse walls having said semi-cylindrical recesses.

3. A pipe spacer as claimed in claim 1 filled with aggregate.

4. A pipe spacer as claimed in claim 1 formed by blow molding.

* * * * *